United States Patent Office 3,403,864
Patented Oct. 1, 1968

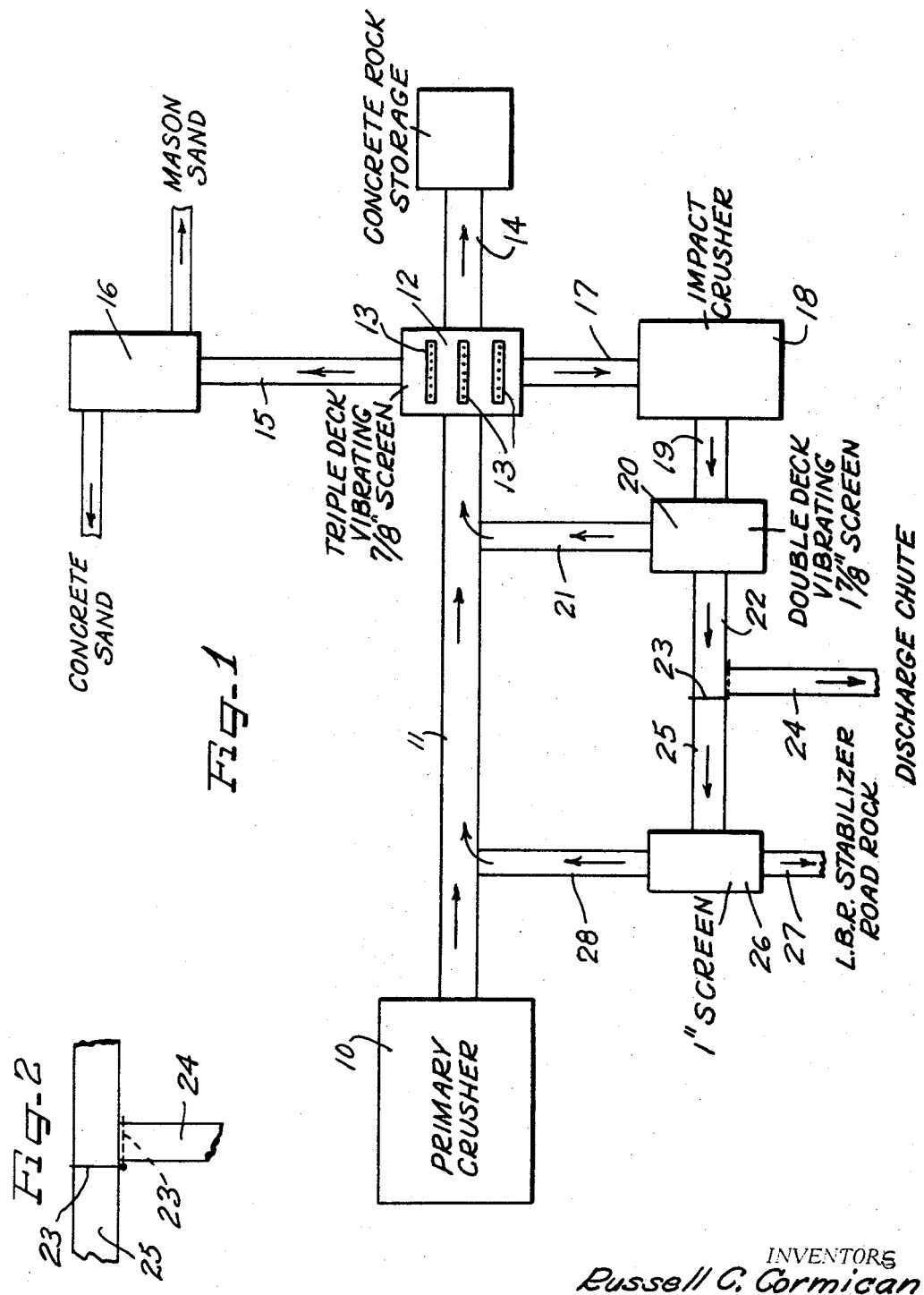

3,403,864
METHOD OF PRODUCING ROADROCK
Russell C. Cormican, Dania, and Charles B. Keene, Pompano Beach, Fla., assignors to Houdaille Industries, Inc., Buffalo, N.Y., a corporation of Michigan
Filed June 8, 1966, Ser. No. 556,163
7 Claims. (Cl. 241—20)

ABSTRACT OF THE DISCLOSURE

This invention relates to a method of producing roadrock having a high carbonate and low silica content from composite mined material having a high silica content by repeated crushing and screening whereby entrapped silica is removed and a relatively high-grade material is produced from low-grade mined material.

This invention relates to a method of producing roadrock having a required minimum carbonate ($CO_3$) content from composite mined material which because of its excess silica contents fails to meet such minimum requirement. Roadrock of the load bearing stabilizer type (L.B.R. stabilizer material) must be of such size that 97% thereof shall pass through a 1" sieve and the material shall be graded down to dust with the fine material consisting of dust of fracture. Such material must contain at least 70% of carbonated ($CO_3$-calcium and magnesium).

As-mined material obtained, for example, in certain portions of the State of Florida contains loose silica in such proportions that it fails to meet the minimum $CO_3$ requirements for roadrock. At the same time, the larger sized portions of such material contain a sufficiently small portion of entrapped silica so that the $CO_3$ content thereof exceeds the minimum 70% requirements.

It is an important object therefore of the present invention to so process as-mined rock material containing less than a required carbonate content as to produce roadrock of a predetermined maximum size graded uniformly down to dust and exceeding the minimum carbonate requirements.

Another object of this invention is to so process such as-mined material as to remove and classify other portions thereof for use as base rock, concrete rock, concrete sand and mason sand, thus efficiently utilizing the mined material to the fullest extent possible.

The process of this invention is carried out in a typical installation in the following manner:

(1) The as-mined material is discharged into a hopper from which it is discharged into a primary jaw crusher to reduce the large rock portions to a size where they may be treated in subsequent operations.

(2) Material leaving the primary crusher is conveyed to one or more vibrating screens where it is sprayed with a low pressure water spray to remove a portion of the free slicia (thus increasing the carbonate content). Material removed at this point is conveyed to suitable storage facilities as concrete rock, concrete sand and mason sand. The top deck of this screen has 7/8" openings.

(3) All oversized material not passing through the screening operation of Step 2 is conveyed to an impact type crusher where it is further reduced in size and where the "fines" produced have a silica content substantially equal to the entrapped silica contained in the larger pieces of rock. With a typical South Florida mined rock, the product at this point has a carbonate ($CO_3$) content well exceeding the minimum requirement of 70%. This material is conveyed on a belt conveyor where all, or a required portion, is delivered to a screen having a 1 7/8" top deck opening and a solid plate at the bottom to hold the fines in the finished product, which is conveyed to a suitable storage facility as a minus 2" base roadrock.

(4) Where it is desired to produce L.B.R. stabilizer roadrock, such diverted high carbonate material is conveyed to a vibrating screen where that portion thereof which will not pass through a 1" screen is returned to the main conveyor for a re-processing and the remainder is conveyed to a stock pile. This remainder material is high grade L.B.R. stabilizer material containing in excess of 70% carbonates (less than 30%) silica.

An arrangement showing the required combination of crushers, screens, low-pressure washers and conveyors which may be employed in practicing the method of this invention is shown on the drawings and hereinafter more fully described.

As shown on the drawings:

FIG. 1 is a diagrammatic view showing an arrangement of crushers, screens, low-pressure water washing means, conveyors and control gates, which may be used in practicing the method of this invention;

FIG. 2 is a fragmentary view showing the arrangement of the conveyors and control gates in discharging the material as minus 2" base rock or conveying it for further screening to produce L.B.R. roadrock material.

As shown on the drawings:

Reference numeral 10 designates a primary crusher, preferably of the jaw type, which effects a primary reduction in size of the mined material (to maximum piece dimensions of approximately 3½"). From the primary crusher the material is discharged onto a main feed belt 11 on which such material is conveyed in a direction shown by the arrow to a vibrating screen 12, the top deck of which has 7/8" openings so that material exceeding 7/8" in size passes over the screen. This screen is provided with low-pressure water wash sprays shown diagrammatically at 13. These sprays remove a portion of the free silica thus increasing the carbonate content of the material leaving the screen (and particularly the material of larger size). Certain material passing through this screen is conveyed by a conveyor 14 to the concrete rock storage which contains particles from minus 3/4" size down to slightly less than 1/4" size. The "fines" which are separated out by screen 12 are conveyed by another conveyor 15 to a screen mechanism 16 (not forming a part of this invention) which delivers these fines to separate piles or storage facilities as mason sand and as concrete sand.

Material passing over the screen 12 is conveyed by a conveyor 17 to a secondary impact type crusher 18, an example of such a crusher being the "Impact Master" No. 3240, manufactured by Universal Engineering Corporation of Cedar Rapids, Iowa, where it is further reduced in size. Material leaving the impact crusher 18 is conveyed by a conveyor 19 to a vibrating screen 20, the top deck of which has openings of 1 7/8" in size so that material in excess of that size passes over the screen. The bottom deck of the screen 20 is preferably made solid so as to retain the fines which at this point are largely composed of particles developed by fracture of the larger pieces of rock and thus have a maximum carbonate (and minimum silica) content dependent, of course, upon the entrapped silica in the rock that has been crushed.

Material not passing through the screen 20 is returned through a conveyor 21 to conveyor 11 for further crushing as previously described.

Material passing through the screen 20 is conveyed by a conveyor 22 to a movable barrier 23 and when that barrier 23 is in the position shown in full lines the finished 2" base rock is discharged to a storage pile through discharge chute 24.

If 1" size L.B.R. stabilizer roadrock is desired the barrier 23 is moved to the dotted line position shown in FIG.

2 and conveyed by a conveyor 25 to a 1" screen 26 where material that passes through said screen 26 is conveyed as L.B.R. stabilizer roadrock by a conveyor 27 to a storage pile. Material not passing through screen 26 is conveyed by a conveyor 28 to the conveyor 11 for further crushing and treatment as above described.

The conveyors used in the practice of this method are standard belt conveyors such as are employed in quarrying or stone-crushing operations. The screens are of a standard make and of types manufactured by Hewitt-Robins, Iowa Manufacturing Company, and Universal Engineering Corporation. For example, screen 20 is a triple deck Hewitt-Robins vibrating screen. Screen 26, used in screening out the L.B.R. stabilizer material, is a double deck vibrator screen conveniently of a type made by Universal Engineering Corporation of Cedar Rapids, Iowa.

As will be apparent from the foregoing, the method of this invention permits of utilization of the mined or quarried material, which as-mined contains an excess of silica but which also contains a large portion rock having entrapped silica of less than 30% and carbonates in excess of 70%. By utilizing the method of this invention, material containing a high silica content is first removed by low pressure water washing and by screening, and is transported to storage locations for further use, for example, as concrete sand and mason sand. During the first washing and screening operation, material passing through a ⅞" screen is carried off as concrete rock and the oversize material proceeding to the impact crusher largely consists of material having entrapped silica only.

Treatment of the latter material in the impact crusher and proper screening thereof provides base roadrock having pieces of a maximum size of 2" and further treatment of such material results in the production of L.B.R. roadrock having pieces of 1" maximum size and fines graduated down to dust, the latter being the dust of fracture. Both the base rock and the L.B.R. bearing material contain carbonates in excess of 70%.

In practicing the method of this invention, it is desirable that the water wash be at low pressure to prevent undue wastage of usable material. It has been found that standard shower spray pipes (frequently referred to as spray bars) supplying water at a maximum pressure of 20 pounds per square inch is satisfactory in that it effects removal of high silica material without undue wastage.

For providing a method of economically producing base roadrock and L.B.R. stabilizer material, this invention permits of an extraction from the mined material of a maximum portion of relatively high-priced product.

We are aware that details of the method of this invention may be varied and that the method may be carried out on apparatus of various makes and construction, and we, therefore, do not propose limiting the patent granted hereon otherwise than necessitated by the scope of the appended claims.

We claim as our invention:
1. A method of producing roadrock of graduated particles having in excess of 70% carbonates comprising
   (1) submitting the as-mined material which overall contains less than 70% carbonates to the action of a primary crusher to reduce the size of the large portions thereof,
   (2) screening the material produced at the primary crusher under a low pressure water spray to reduce the overall silica content thereof and delivering screened material below a predetermined size to storage for later use,
   (3) conveying material of a size too large to pass through said screen (and having a silica content not exceeding that determined by the entrapped silica in such material) to an impact crusher for further reduction in size and the production of fines, the overall material from said impact crusher having a carbonate content of more than 70%, and
   (4) conveying all or a part of said material to a roadrock storage point.
2. The method of claim 1 including conveying all or a portion of the material of Step 3 to a further screen which passes only material of 1" size and less, thus producing L.B.R. stabilizer material 97% of which will pass through a 1" screen graded down to dust consisting of dust of fracture.
3. The method of claim 1 wherein the low pressure water spray of Step 2 is at a maximum pressure of 20 pounds per square inch.
4. The method of claim 1 which includes the further step of screening the material from Step 3 to a vibrating screen having maximum openings of 1⅞".
5. The method of claim 4 which includes providing the vibrating screen with a solid bottom plate to retain the fines.
6. The method of claim 1 which includes classification of fines removed by the water wash and transferring them to storage.
7. The method of claim 4 which includes return of oversize material from the screen for a reprocessing in accordance with Steps 2 and 3.

References Cited

UNITED STATES PATENTS

| | | | |
|---|---|---|---|
| 1,013,100 | 1/1912 | Anderson | 241—20 |
| 2,276,333 | 3/1942 | Overstrud | 241—24 |

OTHER REFERENCES

"Rock Products"; vol. 61, No. 12; December 1958, pp. 84–87.

WILLIAM S. LAWSON, *Primary Examiner.*